May 16, 1972 D. F. GERMAN Re. 27,364

VALVED [SAFETY] SPEED COUPLER

Original Filed Oct. 19, 1966 2 Sheets-Sheet 1

INVENTOR
DALE F. GERMAN

BY Bair, Freeman & Molinare
ATTORNEYS

VALVED [SAFETY] SPEED COUPLER

Original Filed Oct. 19, 1966 2 Sheets-Sheet 2

INVENTOR
DALE F. GERMAN
BY Bair, Freeman & Molinare ATTORNEYS

United States Patent Office

Re. 27,364
Reissued May 16, 1972

27,364
VALVED [SAFETY] SPEED COUPLER

Dale F. German, Bryan, Ohio, assignor to
The Aro Corporation

Original No. 3,423,063, dated Jan. 21, 1969, Ser. No. 587,768, Oct. 19, 1966. Application for reissue July 24, 1970, Ser. No. 58,211
Int. Cl. F16l *29/00, 37/28*
U.S. Cl. 251—149.6 12 Claims

Matter enclosed in heavy brackets [ ] appears in the original patent but forms no part of this reissue specification; matter printed in italics indicates the additions made by reissue.

*ABSTRACT OF THE DISCLOSURE*

*A valved speed coupler includes a rotatable valve element and an arrangement of first radially movable locking elements operable by a first sleeve slidable on the body of the coupler, a second sleeve being also slidable on the body of the coupler and operable to rotate the valve element on an axis normal to the axis of movement of the second sleeve to open and close the valve element, and means for coaction of the sleeves to actuate the locking elements when the sleeves are in a valve open position and release them when the sleeves are in a valve closed position.*

*CROSS REFERENCE TO RELATED PATENT*

*This is a reissue of U.S. Pat. No. 3,423,063 issued Jan. 21, 1969.*

*BACKGROUND AND SUMMARY OF THE INVENTION*

This invention relates to a valved [safety] speed coupler having coupling means for a connection nipple or the like which is operable only when the valve of the coupler is closed, thus eliminating the danger of forceable ejection of the connection nipple (usually attached to a flexible hose or the like) from the coupler during the uncoupling operation, and also avoiding even momentary loss of compressed air from a compressed air line supplying the coupler.

One object of the invention is to provide a valved [safety] speed coupler which is so constructed that a connection nipple is prevented from being removed from the coupler while under pressure which also prevents blasting air through the coupler when the nipple is removed.

More specifically, a coupler is provided which has a valve element therein movable to opened and closed positions, and an arrangement of first radially movable locking elements operable by a first sleeve slidable on the body of the coupler, a second sleeve being also slidable on the body of the coupler and operable to coact with the valve element to open it in one position thereof and close it in another position thereof, means of coaction being provided between the two sleeves to actuate the locking elements when the sleeve is in valve-opened position and release them when the sleeve is in valve-closed position.

Another object is to provide holding means for the first sleeve in the form of second radially movable locking elements and a peripheral groove in the valve body, these locking elements being releasable by operation of the first sleeve.

Still another object is to provide upstream and downstream sealing elements for the valve element in the coupler, such sealing elements having pilot portions slidable in the valve body and subject to upstream and downstream pressures, the effective areas of the pilot portion being larger than the effective areas of the portions of the sealing elements against the valve element to utilize such pressures to effect sealing.

A further object is to provide the valve element in the form of a ball, and the sealing elements with spherical seats seating thereagainst, the means of coaction between the second sleeve and the ball being in the form of a cross pin carried by the sleeve and engageable in a slot extending into the periphery of the ball.

Still a further object is to provide the downstream sealing element with a portion which seals against the connection nipple when the nipple is inserted into the coupler.

An additional object is to provide the valve element with a bleed slot coacting with the downstream portion of the valve body in the closed position of the valve for releasing downstream pressure before the connection nipple is removed from the body of the coupler.

Another additional object is to provide a third sleeve slidable inside the body of the coupler, biased toward the connection nipple and engageable therewith to engage the first radially movable locking elements to hold them against inward movement when the connection nipple is removed from the coupler.

*BRIEF DESCRIPTION OF THE DRAWING*

With these and other objects in view, my invention consists in the construction, arrangement and combination of the various parts of my valved [safety] speed coupler, whereby the objects above contemplated are attained, as hereinafter more fully set forth, pointed out in my claims and illustrated in detail on the accompanying drawings, wherein:

*DESCRIPTION OF THE PREFERRED EMBODIMENT*

Figure 1:
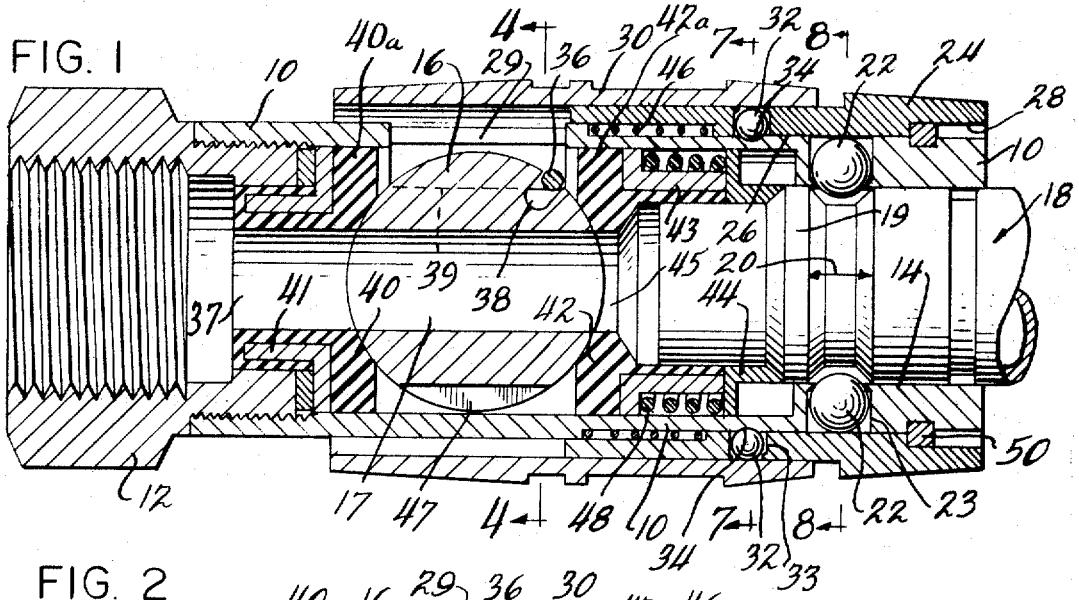
FIG. 1 is an enlarged axial sectional view of a valved safety speed coupler embodying my invention, and shows a connection nipple in association therewith, the two being coupled together.

On the accompanying drawings I have used the reference numeral 10 to indicate a valve and coupler body. An inlet fitting 12 is provided at one end with which a compressed air supply hose (not shown) may be connected. The body 10 has an outlet bore 14 at its right hand end in FIG. 1.

A ball shaped valve element 16 is located within the body 10, and a connection nipple 18 is adapted to be entered into and withdrawn from the outlet bore 14. The connection nipple 18 is provided with a peripheral locking groove 20 in which first radially movable locking elements 22 in the form of balls are cooperable. The balls 22 are radially movable in perforations 23 of the body 10. A lock-operating first sleeve 24 is slidable on the body 10 and has a locking bore 26 of one diameter and an unlocking bore 28 of larger diameter.

Figure 4:
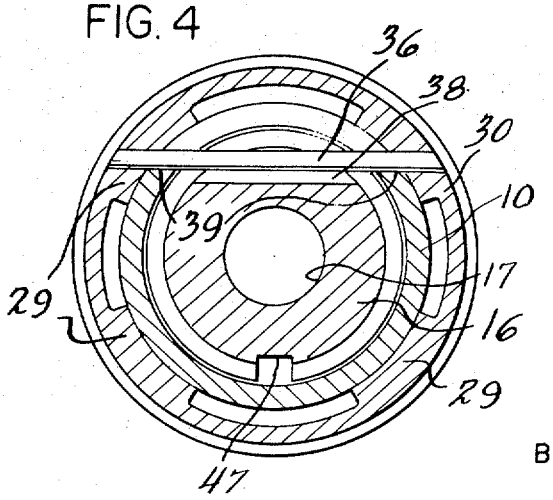
FIG. 4 is a sectional view on the line 4—4 of FIG. 1 showing an operative connection between a valve operating sleeve and a ball-shaped valve element in the coupler.
Figure 3:
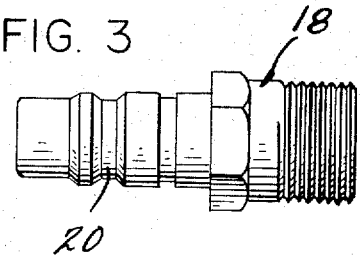
FIG. 3 is a side elevation on a reduced scale showing the complete connection nipple which is only partly shown in FIGS. 1 and 2.

A valve operating second sleeve 30 is also slidable on the valve body 10, a portion thereof having lands 29 directly slidable on the valve body as shown in FIG. 4 and another portion thereof being bored out to a diameter such that it slides on the outside of the first sleeve 24 as shown in FIG. 1. Second radially movable locking elements 32 are provided in perforations 33 of the first sleeve 24 and these are adapted to coact with a peripheral groove 34 around the body 10.

The second sleeve 30 is provided with a projection in the form of a pin 36 as shown in FIGS. 1 and 4 to actuate the ball valve 16, the pin being located in an off-axis slot 38 thereof. The body 10 is provided with a notch, the bottom of which is indicated at 39, to accommodate the pin 36 during sliding of the sleeve 30 between its limits of position shown in FIGS. 1 and 5 or 6 as will hereinafter appear.

An upstream sealing element 40 and a downstream sealing element 42 are provided as shown in FIG. 1 having spherical seats to seal against the surface of the ball 16. The sealing elements also have flange-like pilot portions 40a and 42a slidable in the bore of the body 10 and subject to upstream and downstream pressures respectively. The pilot portions have effective areas greater than the effective areas of the spherical seats against the ball valve 16 as illustrated so that the upstream and downstream pressures can be utilized for sealing purposes without the necessity of providing springs or the like for that purpose. The sealing elements 40 and 42 may be in the form of rubber or the like molded on reinforcing rings 41 and 43 respectively.

A spring 46 is provided which is interposed between an annular shoulder of the body 10 and an annular shoulder of the first sleeve 24 to normally project the sleeve to the position shown in FIG. 1. A spring 48 is provided between an annular shoulder of the reinforcing ring 43 and a flange-like shoulder of a third sleeve 44 slidable inside the body 10. A retainer ring 50 is mounted in a peripheral groove of the body 10 adjacent the right hand end thereof to keep the first sleeve 24 assembled relative to the body of the coupler.

Figure 5:
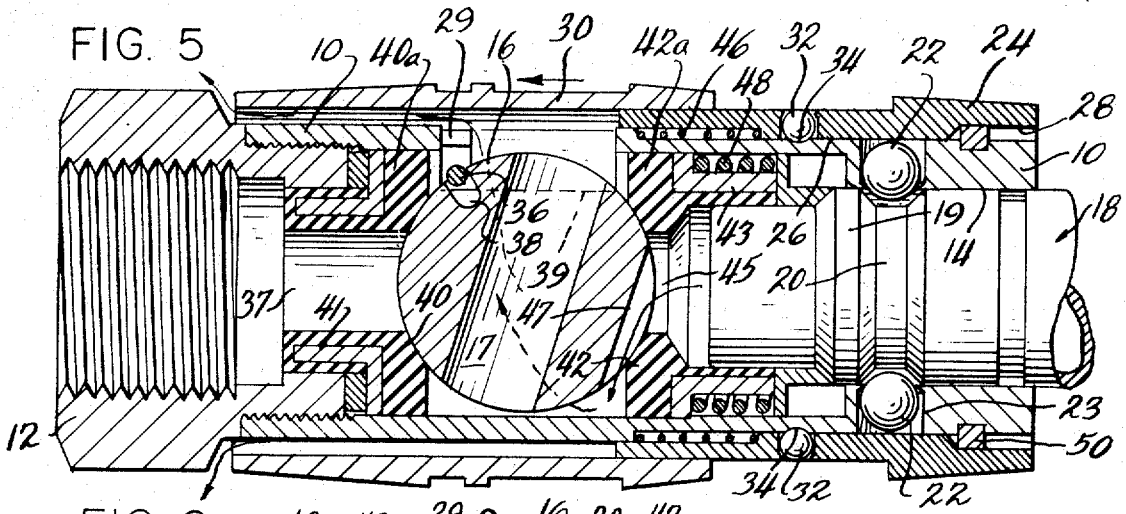
FIG. 5 is a sectional view similar to FIGS. 1 and 2 showing the valve fully closed but the connection nipple still coupled.

The perforations 23 have shoulders 25 at their inner ends (as shown in the lower perforation 23 of FIG. 2 from which the locking elements 22 has been omitted to show the shoulder) to prevent the locking elements 22 from falling out of position in the body 10, and the perforations 33 have peened outer ends to avoid loss of the locking elements 32 when the second sleeve 30 is retracted as in FIG. 5.

PRACTICAL OPERATION

In the operation of my valved safety speed coupler, the coupler is associated with the connection nipple 18 as shown in FIG. 1 and the valve is open for supplying air from the inlet fitting 12 to the connection nipple. Upstream pressure is acting on the upstream sealing element 40 and specifically the pilot portion 40a thereof to seal the spherical surface of the element against the upstream side of the ball valve 16. Air flows through a bore 17 of the ball 16 and through bores 37 and 45 of the upstream and downstream sealing elements 40 and 42 respectively. Downstream pressure acts on the pilot portion 42a of the element 42 to seal its spherical seat against the downstream side of the ball 16 and the air flows into the connection nipple 18 and from there through a hose or the like to the point of use of the compressed air.

Figure 2:
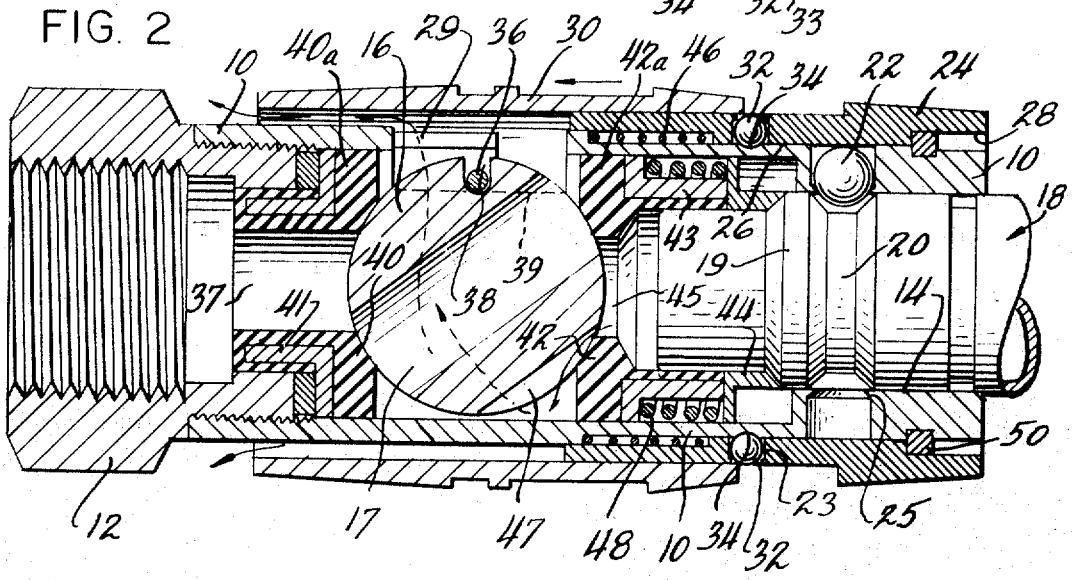
FIG. 2 is a view similar to FIG. 1 showing a valve operating sleeve being slid back on the coupler for closing the valve in the coupler, the valve being approximately half way open.

When it is desirable to remove the connection nipple 18 from the coupler, the first sleeve 24 must be pulled back (toward the inlet fitting 12) against the bias of the spring 46 but an inspection of FIG. 1 shows that this cannot be done because the locking elements 32 are held in the peripheral groove 34 by the second sleeve 30. However when the sleeve 30 is pulled back as shown in FIG. 2, it begins to release the balls 32 and at this time the ball valve is approximately half way open but a vent groove 47 therein has opened the downstream side of the ball to atmosphere as indicated by the arrows in FIG. 2 passing behind the ball and to atmosphere out of the left hand end of the sleeve 30. Thus the downstream pressure in the connection nipple 18 and the hose leading to a pneumatic tool or the like is bled to atmosphere before it is possible to release the connection nipple from the coupler so that the nipple and the attached hose are not blown out of the coupler because of the air trapped in them.

Further movement of the sleeve 30 to the position of FIG. 5 fully closes the ball valve but still leaves the vent 47 open. The locking elements 32 can now be pushed out of the peripheral groove 34 by backward movement of the first sleeve 24 as to the position shown in FIG. 6.

Figure 6:
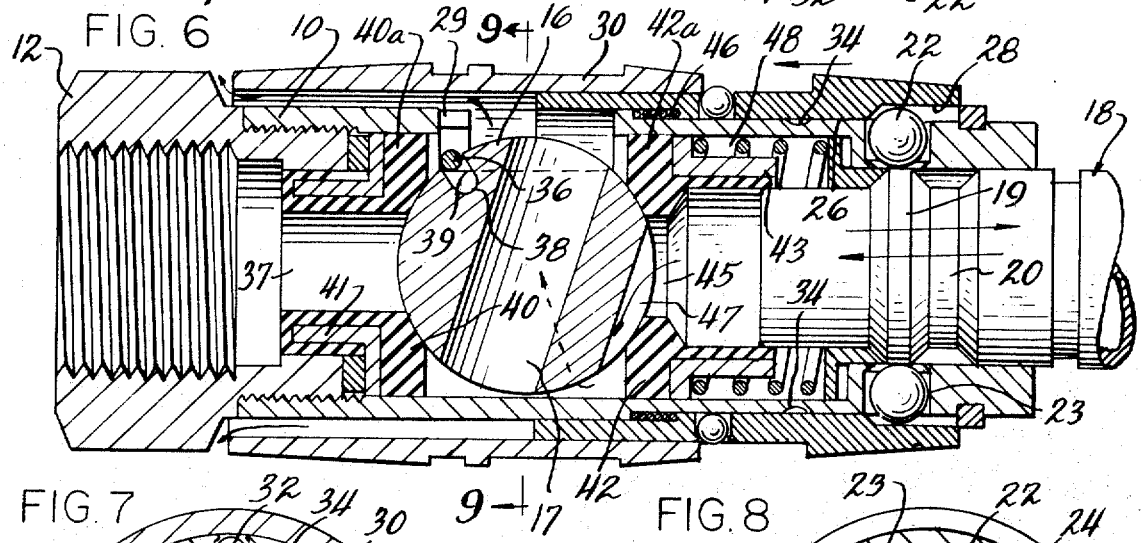
FIG. 6 is a similar sectional view showing the connection nipple partially uncoupled.
Figure 7:
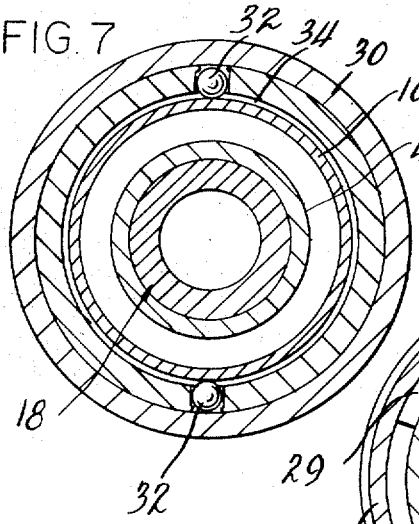
FIGS. 7, 8 and 9 are sectional views on the lines 7—7 and 8—8 of FIG. 1, and on the line 9—9 of FIG. 6.
Figure 8:
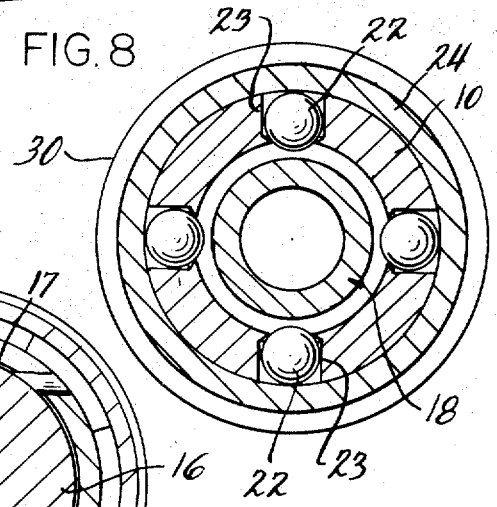
Figure 9:
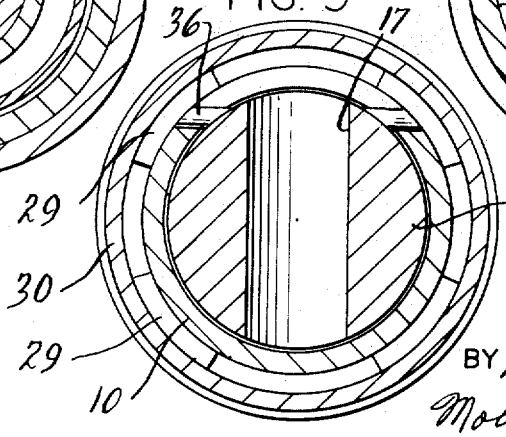

The connection nipple 18 may now be pulled from the position of FIG. 5 to the position of FIG. 6 and the spring 48 will expand to cause the third sleeve 44 to follow a flange 19 of the nipple 18 to the left of the locking groove 20 as shown in FIG. 6 and this third sleeve will, upon slight further movement of the nipple to the right, pass under the locking balls 22 to hold them in the unlocked position shown in FIG. 6.

Subsequently, when it is desirable to reinsert the nipple 18 into the coupler, the nipple will push the third sleeve 44 to the left against the action of the spring 48 until the position of FIG. 5 is attained whereupon the first sleeve 24 is released by the balls 22 and will be forced by the spring 46 to the locked position of FIG. 5. Thereupon the second sleeve 30 may be slid outwardly for rendering effective the locking balls 32 as shown in FIGS. 1 and 2 to again prevent unlocking movement of the sleeve 24 except after the sleeve 30 has been actuated to close the ball valve 16.

In summary, the connection nipple 18 is prevented from being removed while the coupler is under pressure. When the nipple is removed the third sleeve 43 follows and stops under the balls 22, holding them in the raised position. This prevents the sleeve 24 from returning to the forward position. With the sleeve 24 in the back position, the balls 22 are locked outward and the sleeve 30 cannot be pushed forward. This prevents blasting air through the coupler when the connection nipple is removed. The connector is recoupled by a reverse sequence of operations.

Some changes may be made in the construction and arrangement of the parts of my valved safety speed coupler without departing from the real spirit and purpose of my invention, and it is my intention to cover by my claims any modified forms of structure or use of mechanical equivalents which may reasonably be included within their scope.

I claim as my invention:

1. In a valved [safety] speed coupler, a valve and coupler body having inlet and outlet ends, a valve element therein movable to opened and closed positions, said outlet end being designed to receive a connection nipple having a peripheral locking portion, a locking element carried by said body for coaction with said locking portion of said nipple, a first sleeve slidable on said body and having a locking portion of one diameter coacting with said locking element to render it effective and another portion of larger diameter coacting wtih said locking element to render it ineffective and thereby permit disconnection of said nipple from said coupler, a second sleeve slidable on said body and coacting with said valve element to open it in one position thereof and close it in another position thereof, *said valve element being rotatable to open and closed positions on an axis normal to the axis of movement of said second sleeve,* holding means for said first sleeve, and means of coaction between said first and second sleeves to actuate said holding means to its holding position when said second sleeve is in valve opened position and for releasing said holding means when said second sleeve is in valve-closed position.

2. A valved [safety] speed coupler according to claim 1 wherein said holding means comprises a second locking element and peripheral groove means of coaction between said body and said first sleeve.

3. A valved [safety] speed coupler according to claim 1 wherein [said valve element is rotatable to opened and closed positions on an axis normal to the axis of movement of said second sleeve, and] said second sleeve has a projection coacting with an off-axis portion of said valve element.

4. A valved [safety] speed coupler according to claim 1 wherein upstream and downstream sealing elements are provided and engage said valve element, and have pilot portions slidable in said valve and coupler body and subjected to upstream and downstream pressures, the effective areas of said pilot portions being larger than the effective areas of the portions of said sealing elements against said valve element to utilize such pressures to effect sealing, and passageways through said valve body, said valve element and said sealing elements.

5. A valved [safety] speed coupler according to claim 4 wherein said downstream sealing element has a portion sealed against said connection nipple when it is received within said valve and coupler body.

6. A valved [safety] speed coupler according to claim 3 wherein upstream and downstream sealing elements are provided to engage said valve element and each has a pilot portion slidable in said body and subject to upstream and downstream pressures, the effective areas of said pilot portions being larger than the effective areas of the portions of said sealing elements against said valve element to utilize such pressures to effect sealing a passageway through said valve and coupler body and said valve element.

7. A valved [safety] speed coupler according to claim 1 wherein said valve element is a ball having a passageway therethrough and is rotatable to opened and closed positions on an axis normal to the axis of movement of said second sleeve relative to said body, and said means of coaction comprises said second sleeve having a projection spaced from the axis of rotation of said ball and coacting with said ball to rotate it on its axis upon sliding movement of said second sleeve.

8. A valved [safety] speed coupler according to claim 7 wherein upstream and downstream sealing elements are provided which have spherical seats to engage said valve element and have pilot portions slidable in said valve and coupler body and subjected to upstream and downstream pressures, the effective areas of said pilot portions being larger than the effective areas of said spherical seats to utilize such pressures to effect sealing, and passageway means through said valve and coupler body, and through said valve element.

9. A valved [safety] speed coupler according to claim 7 wherein said ball has a bleed slot coacting with the downstream portion of said valve body in the closed position of said ball which releases the downstream pressure before said connection nipple is removed from said body.

10. A valved [safety] speed coupler according to claim 1 wherein said valve element is so constructed and arranged as to bleed air from the downstream side of said coupler to atmosphere when the valve is in closed position.

11. A valved [safety] speed coupler according to claim 1 wherein a third sleeve is slidable inside said body and biased toward said connection nipple, said third sleeve being operative upon removal of said connection nipple from said outlet end of said body to engage said first locking element to hold it in unlocked position.

12. A valved [safety] speed coupler according to claim 7 wherein said projection comprises a pin carried by said second sleeve and normal to the axis thereof, said ball having a radial slot inwardly from the periphery thereof and slidably receiving said pin.

References Cited

The following references, cited by the Examiner, are of record in the patented file of this patent or the original patent.

UNITED STATES PATENTS

| | | | |
|---|---|---|---|
| 3,112,767 | 12/1963 | Cator | 137—614.06 |
| 3,314,447 | 4/1967 | Collar et al. | 285—316 |
| 3,367,366 | 2/1968 | Oliveau et al. | 137—614.06 X |

FOREIGN PATENTS

| | | | |
|---|---|---|---|
| 844,258 | 8/1960 | Great Britain | 137—614.06 |

WILLIAM R. CLINE, Primary Examiner

U.S. Cl. X.R.

137—614.06; 285—316